June 24, 1930.  A. GAUCHOT  1,768,445
MUD GUARD SYSTEM FOR MOTOR CARS AND THE LIKE
Filed Feb. 24, 1927   7 Sheets-Sheet 1

Inventor
Arthur Gauchot

By William C. Linton
Attorney.

June 24, 1930.  A. GAUCHOT  1,768,445
MUD GUARD SYSTEM FOR MOTOR CARS AND THE LIKE
Filed Feb. 24, 1927  7 Sheets-Sheet 2

Inventor
Arthur Gauchot
By William C. Linton,
Attorney.

June 24, 1930. A. GAUCHOT 1,768,445
MUD GUARD SYSTEM FOR MOTOR CARS AND THE LIKE
Filed Feb. 24, 1927 7 Sheets-Sheet 6

Fig. 8.

Inventor
Arthur Gauchot
By William C. Linton.
Attorney.

June 24, 1930. A. GAUCHOT 1,768,445
MUD GUARD SYSTEM FOR MOTOR CARS AND THE LIKE
Filed Feb. 24, 1927 7 Sheets-Sheet 7

Inventor
Arthur Gauchot
By William C. Linton
Attorney.

Patented June 24, 1930

1,768,445

UNITED STATES PATENT OFFICE

ARTHUR GAUCHOT, OF PARC ST. MAUR, FRANCE

MUD-GUARD SYSTEM FOR MOTOR CARS AND THE LIKE

Application filed February 24, 1927, Serial No. 170,707, and in France February 24, 1926.

The present invention relates to a mud guard system for motor cars and the like, having for an object to provide a mud guard mounted with the wheels of a vehicle to prevent the side splashing of mud and water and adapted to yield giving way to all obstacles without, however, assuming a permanent distortion but capable of instantly returning to its normal and functioning position.

Another important object of the invention resides in the provision of a mudguard of the character mentioned having a shield composed of an apron of mail or interwoven wire rings, adapted to stop the water and mud splashed by the wheels of the vehicle to which it is attached yet being so constructed that it will always yield in any direction at the meeting of an obstacle, and return to its normal position upon leaving the obstacle.

It is also amongst the desired aims of the invention to provide a mud guard having a shield designed to adopt itself to any formation when wedged between a curb and the wheel of a vehicle without however assuming a permanent distortion, and a yieldable support for said shield contributing in the disengagement of the wedged shield without detriment thereto and adapted to return the same to its normal position immediately upon its disengagement.

Other important objects and advantages of the invention will be in part obvious and in part pointed out hereinafter.

In order that the invention and its mode of operation may be understood by those skilled in the art, I have in the accompanying drawings set out the preferred embodiments of the invention.

Referring more particularly to the drawings wherein like characters of reference will designate corresponding parts throughout, my improved device may be stated to include a shield of an interwoven metallic ring or apron or mail A yieldably mounted on a vehicle wheel R and suspended near the ground to normally cover the lower portion of the tire S of the wheel R. The metallic rings of the shield A are closely interwoven at the lower portion to efficiently intercept water and mud, and preferably loosen gradually towards the upper portion so that a high flexibility will be imparted to the shield A.

Because of this particular construction it will be readily understood that the shield A, normally suspended near the ground will prevent the splashing of water and mud and upon meeting of an obstacle, such as the asperities of the road, it will advantageously yield, but will instantly return to its normal position upon leaving the encountered obstacle.

Figure 1:
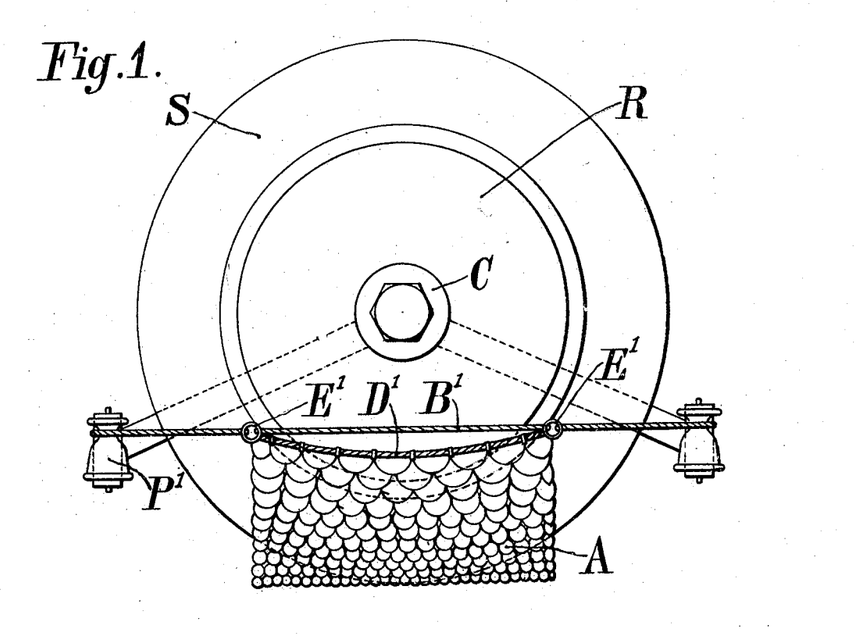
Figure 1 is an elevation of the device mounted on the wheel of a vehicle.
Figure 2:
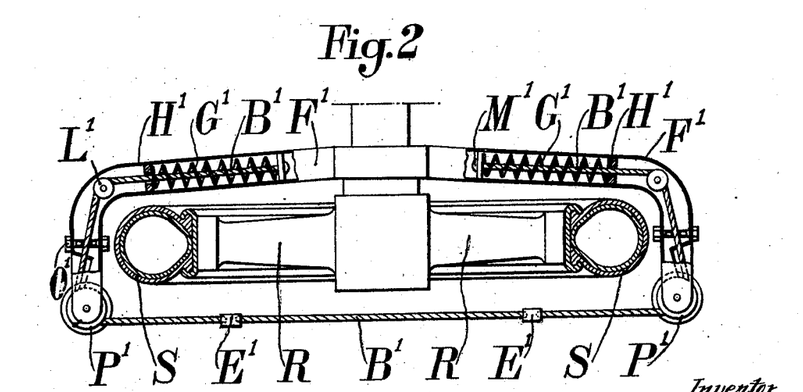
Figure 2 is a plan of the same having portions in cross section.
Figure 3:
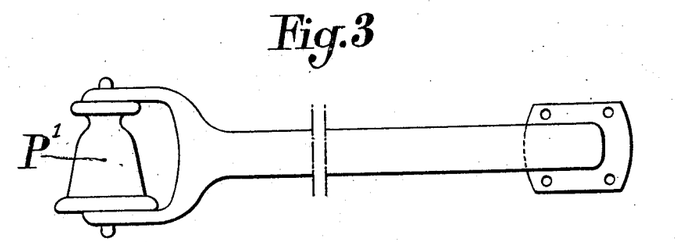
Figure 3 is an enlarged detail of one of the pulleys used in my improved device.

Referring now to Figures 1 and 2 of the drawings, showing one possible embodiment of the invention, a hollow shaft F' is mounted in rear of the vehicle wheel R, and bent to extend forwardly thereof. The free ends of the hollow shaft are provided with a pulley P' preferably of conical shape as more clearly shown in Figure 3, receiving a cable B' introduced into the hollow shaft F' and having its ends secured to a washer like member M' adapted to reciprocate in said hollow shaft.

Fixed at suitable points within the hollow shaft is the rigid member H' through which passes the cable B', and on which rests a coil spring G' urging the free ends of the cable B' towards the inner portion of the hollow shaft F'. Because of this construction, it will be understood that the cable B' will be properly stretched in front of the wheel yet will be capable of moving laterally thereof.

With a view towards facilitating the movements of the cable B', suitable pulleys 2' on which the cable rides, are mounted at the bent portions of the hollow shaft F'. These pulleys obviously will also help to properly stretch the cable B'.

Suitably secured to this cable and symmetrically disposed on each side of the hub C of the wheel R are two rings E' receiving a cable D' to which is suspended the shield of interwoven metallic rings or apron of mail A, covering the lower portion of the tire S.

It will now be understood that the splashing of water and mud by the wheels of the vehicle will be prevented by means of the normally suspended shield A. Should the wheel rub against an obstacle such as a curb, the shield A will be wedged and accordingly be urged towards the back of the wheel R. Because of the construction and arrangement of the springs G' the cable B' will laterally yield with the shield A. This lateral movement of the shield and cable may be limited by means of set screws O' mounted at suitable points on the hollow shaft F' and adjusted to prevent the passage of the rings E'. Upon leaving the obstacle, the shield A will be returned to its normal position by means of the cable B' through the action of the springs G'.

Figure 4:
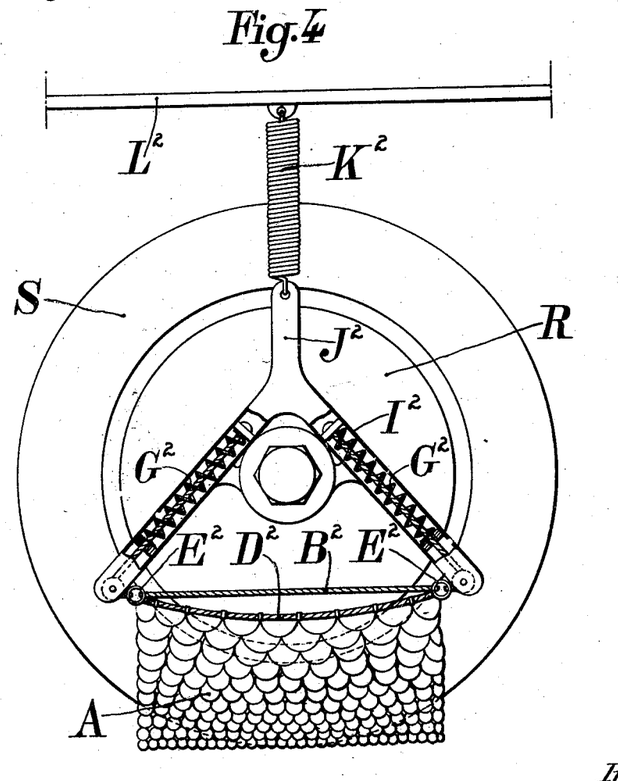
Figures 4, 5, 6, 7 and 8 are different modifications of the invention.

A modification of the invention is shown in Figure 4. Herein, a hollow frame I² having two outwardly diverging branches is pivotally mounted on the hub C of the wheel R. The ends of a cable B² are introduced into the hollow frame I² and urge therein by means of spring G² mounted in the same manner as dscribed hereinbefore.

Suitably secured to the cable B² are rings E² to which is attached a cable D² normally supporting the shield A opposite the lower portion of the tire S on the wheel R and allowing said shield to yield laterally at the meeting of an obstacle.

The frame I² being pivoted to the hub C, will also yield under the action of the wedged shield thereby contributing to the disengagement of the shield A without any rupture thereof.

The pivoted frame I² is normally maintained in a vertical position by means of a vertical arm J² preferably formed integral with the frame and receiving a coil spring K² secured to parts L² of the vehicle.

Figure 5:
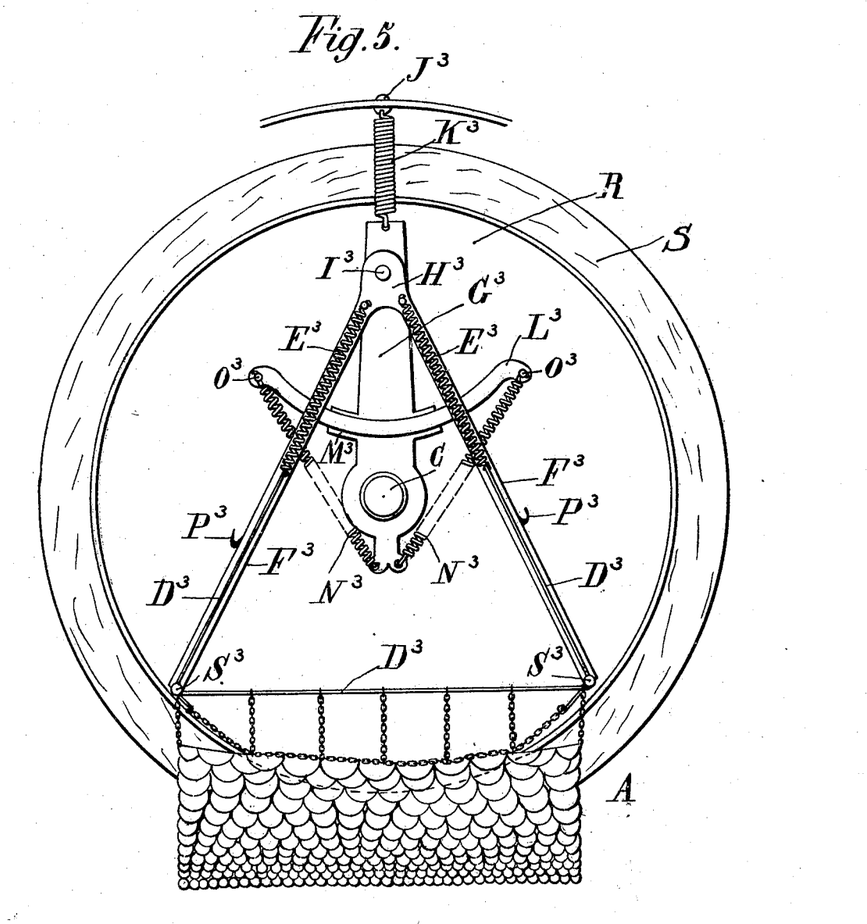

In the modification of the invention illustrated in Fig. 5, an arm G³ carrying a guide member M³ in the lower portion thereof is pivotally mounted on the hub C of the wheel R and normally held in a vertical position by means of a coil spring K³ secured to suitable parts J³ of the vehicle.

Pivoted to the upper portion of the arm G³ is a frame F³ of substantially inverted V shaped formation adapted to oscillate and guided in its movements by an upwardly curved member L³ fixed thereto and engaged by the guide member M³ of the arm G³. The frame F³ is maintained in its normal position by coil springs N³ secured to the lower portion of the pivoted arm G³ and the free ends O³ of the curved member L³ projecting beyond the frame F³.

Arranged with the frame F³ is a cable D³ stretched by springs E³ and free to ride on rollers or pulleys S³ mounted on the free ends of the inverted V-shaped frame F³. To this cable is suitably attached the shield A normally suspended adjacent the tire S of the wheel R, to prevent the side splashing of water and mud by said wheel.

When meeting with an obstacle, it will be understood that the shield will wedge pulling on cable D³ and pivoting the frame F³ and arm G³ thereby dampening and absorbing the shocks that could destroy the device. Upon leaving the obstacle the arm G³ will be returned to its position by the spring K³, likewise the frame F³ will be reset through the springs N³, and the action of the springs E³ will return the shield A to its normal and suspended position.

When not in use the shield A may be raised and the lower portion thereof be attached to hooks mounted at suitable points on the frame F³.

Figure 6:
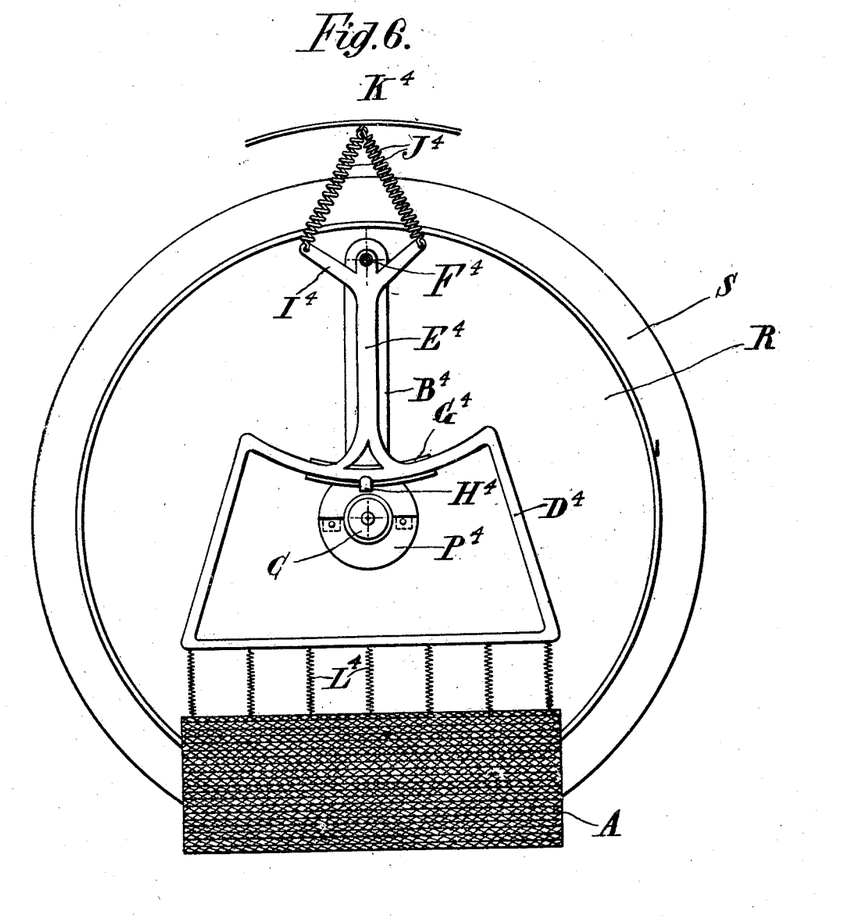

In the device disclosed in Fig. 6 an arm B⁴ carrying guide member G⁴ at its lower portion is freely mounted in the hub C of a vehicle wheel R. The lower hub engaging end of the arm B⁴ is preferably formed of a separate plate P⁴, hinged, bolted or dowelled to the arm B⁴, permitting an easy mounting and removal of the device.

Pivoted to the upper portion of the arm B⁴ as shown at F⁴, is a smaller arm E⁴ having adjacent its pivoted point a pair of upwardly diverging branches I⁴ each receiving a coil spring J⁴ which is secured to a fixed point K⁴ of the vehicle. These springs manifestly will normally maintain the arms E⁴ and B⁴ in a vertical position, but will allow the same to yield when forced.

Integral with the lower portion of the smaller arm E⁴ is a suitable frame D⁴ slidably engaged by the guide member G⁴ of the arm B⁴ and retained thereon by means of a tongue H⁴. The lower part of this frame is provided with a plurality of relatively spaced coil springs L⁴ to which is attached the shield of interwoven metallic rings A normally suspended adjacent the tire S of the wheel R.

While in this position, it will be understood that the shield A will prevent all splashing of water and mud of the wheels R of the vehicle on which the device is mounted. Upon meeting of an obstacle such as a curb, it will likewise be understood that the shield A will yield, helped in its movement by the suspension springs L⁴. The frame D⁴ being then under tension and guided by member G⁴ and tongue H⁴ will pivot about its axis F⁴ carrying along the free arm B⁴, all contributing to the disengagement of the shield A without any detriment thereto. Upon disengagement of the shield A, the whole device will obviously return to its normal position by virtue of the springs J⁴.

Figure 7:
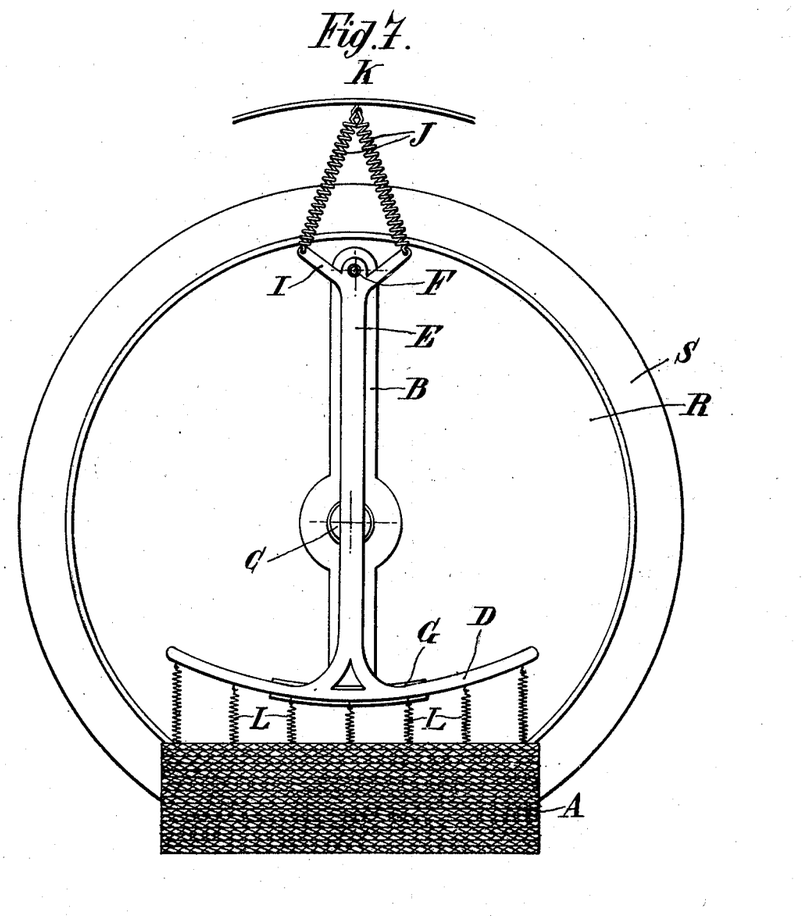

Figure 7 illustrates a further modification in the embodiment of the invention. Herein, an arm B pivoted at its intermediate portion to the hub C of the wheel R, supports at its upper end a smaller arm B free to pivot about its axis F. The upper end of the smaller arm E is provided with a pair of upwardly diverging branches I each receiving a coil spring J secured to part of the vehicle as shown at K, while the lower end of the arm E terminates with a right angularly disposed bar D adapted to move with said arm. The bar D is preferably slightly curved and guided by a guide member G suitably mounted on the free end of the arm B.

Secured to the bar D is a plurality of coil springs L carrying the shield of interwoven metallic rings A normally suspended adjacent the tire S of the wheel R preventing the splashing of water and mud but capable of yielding at the meeting of an obstacle and adapted to return immediately to its normal position upon leaving the obstacle as clearly and fully brought out hereinbefore.

Figure 8:
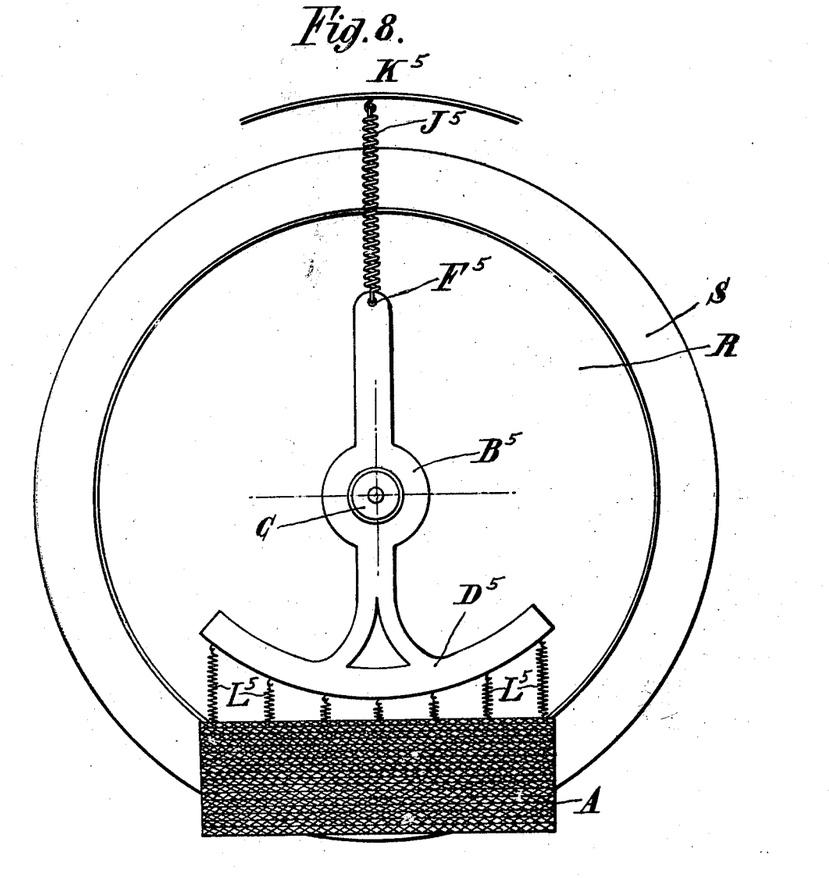

A simpler embodiment of the invention principally adaptable for "sport cars" is disclosed in Fig. 8. A solid piece of metal B⁵ or other suitable material is pivoted at its medial portion to the hub C of the wheel R, and normally held in a vertical position by a spring J⁵ attached to the upper end thereof and secured to suitable parts of the vehicle as shown at K⁵. Formed integral with the lower end of the pivoted piece B⁵ is an upwardly curved bar D⁵ carrying a plurality of relatively spaced coil springs L⁵ to which is secured the shield of interwoven metallic rings A suspended over the lower portion of the tire S of the wheel R to prevent water and mud from splashing.

It will be readily understood that should the shield A be wedged between the tire S and an obstacle such as a curb, the shield will yield because of its construction, helped in its movement by the springs L⁵. The solid piece B⁵ being free to pivot about the hub C, will also yield contributing in the disengagement of the shield A. Once disengaged the shield will be instantly brought to its normal and functioning position by action of the several springs L⁵ and held in that position by the spring J⁵.

Figure 9:
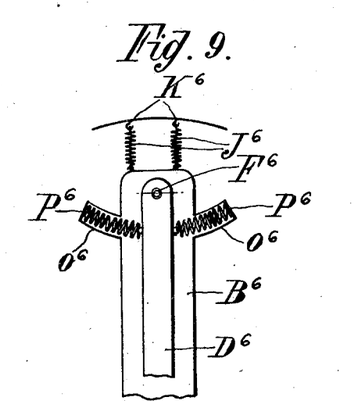
Figure 9 is a modification of the means for returning the mud guard in its normal position.

Manifestly, several different means may be used to hold my improved device to its normal position. For instance, as shown in Fig. 9, coil spring P⁶ retained in suitable casings O⁶ formed with the larger arm B⁶ engaged in the side of the smaller arm B⁶ pivoted at its upper portion F⁶ to the arm B⁶ and urge said smaller arm in a vertical position, while a plurality of coil springs J⁶ secured to suitable parts K⁶ of the vehicle and to the arm B⁶ tends to hold the same in its normal position.

Figure 10:
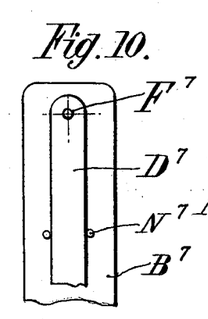
Figure 10 is a further modification thereof.
Figure 11:
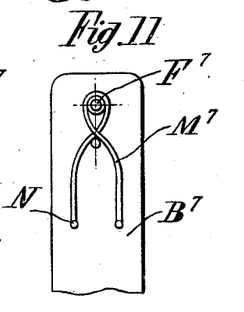
Figure 11 is a similar view with the pivoted arm removed to show the construction of the spring.
Figure 12:
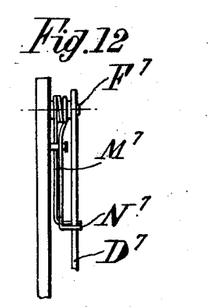
Figure 12 is a side view of the same.

Again, as disclosed in Figs. 10, 11 and 12, the arm D⁷ pivoted by means of a pin F⁷ or the like to the larger arm B⁷, may be urged into a vertical position by a wire spring M⁷ retained by the pivoting pin F⁷ and having its ends bent outwardly to engage the sides of the arm D⁷ below its pivoting point.

Having thus described the invention, I claim:

1. A mud guard for vehicles comprising an arm pivotally supported on the wheel of the vehicle, a flexible shield spaced from said arm, and a plurality of springs relatively spaced along one edge of said shield with one of their ends connected to the latter and having their other ends secured to said arm and freely supporting said shield, whereby the latter will have free movement in all directions against the tension of the springs.

2. A mud guard for vehicles comprising a support pivotally mounted on the wheel of the vehicle, an arm pivoted to said support, yieldable means connected to portions of the vehicle and to said arm for normally holding the same together with its support in a vertical position upon said wheel, a flexible shield, and a plurality of springs relatively spaced along one edge of said shield with one of their ends connected to the latter and having their other ends secured to said support.

3. A mud guard for vehicles comprising a support pivotally mounted on the wheel of the vehicle, an arm having one end pivoted to said support and the other end terminated with a right angularly disposed bar, yieldable means connected to portions of the vehicle and to said arm for normally holding the same together with its support in a vertical position upon the wheel, a flexible shield, and a plurality of coiled springs relatively spaced along one edge of said shield with one of their ends connected to the latter and having their other ends secured to the right angularly disposed bar of said support.

4. A mud guard for vehicles comprising a support having its intermediate portion pivotally mounted on the wheel of the vehicle and carrying a guide member at one end thereof, an arm having one end pivoted to the free end of the support and the other end terminated with the right angularly disposed bar, yieldable means connected to portions of the vehicle and to said arm for normally holding the same together with its support in a vertical position upon said wheel, a flexible shield, and a plurality of springs relatively spaced along one edge of said shield with one of their ends connected to the latter and having their other ends secured to the right angularly disposed bar of said support.

In witness whereof I have hereunto set my hand.

ARTHUR GAUCHOT.